United States Patent [19]

Avaneas

[11] Patent Number: 4,973,955
[45] Date of Patent: Nov. 27, 1990

[54] DATA TRANSMISSION SYSTEM

[75] Inventor: Napoleon G. Avaneas, Kings Park, N.Y.

[73] Assignee: Grumman Aerospace Corporation, Bethpage, N.Y.

[21] Appl. No.: 308,439

[22] Filed: Feb. 9, 1989

[51] Int. Cl.[5] .......................... H04Q 3/00; H04J 3/02
[52] U.S. Cl. ............... 340/825.05; 370/85.12; 370/85.15
[58] Field of Search .............. 340/827, 825.01, 825.03, 340/825.05; 370/85.15, 85.12, 85.5; 371/8.1, 8.2, 11.1, 11.2; 379/272, 273; 364/900

[56] References Cited

U.S. PATENT DOCUMENTS

| | | |
|---|---|---|
| 3,162,827 | 12/1964 | Border et al. . |
| 4,017,828 | 4/1977 | Watanabe et al. . |
| 4,048,446 | 9/1977 | Hafner et al. . |
| 4,190,821 | 2/1980 | Woodward ........................ 371/8.2 |
| 4,211,920 | 7/1980 | Wakabayashi . |
| 4,393,492 | 7/1983 | Bishop ................................ 371/11.2 |
| 4,464,658 | 8/1984 | Thelen . |
| 4,514,841 | 4/1985 | Sen-Sandberg . |
| 4,545,074 | 10/1985 | Balliet et al. . |
| 4,633,246 | 12/1986 | Jones et al. ..................... 340/825.05 |
| 4,837,856 | 6/1989 | Glista ............................... 370/85.12 |

OTHER PUBLICATIONS

"A Digital Transmission Line Switching System", Japan Telecommunications Review, Apr., 1980, vol. 22, No. 2, pp. 127-134, by Takashima et al.
"Bidirectional Loop for Digital Transmission", IBM Technical Disclosure Bulleting, Aug., 1972, vol. 14, No. 3, pp. 1000 and 1001, by Besseyre, et al.

Primary Examiner—Ulysses Weldon
Attorney, Agent, or Firm—Scully, Scott Murphy & Presser

[57] ABSTRACT

A data transmission system comprising a plurality of connecting units, data lines interconnecting the connecting units in a sequence to form a data bus, and a plurality of data terminals. Each terminal is directly connected to a respective one of the connecting units to transmit data between the terminal and that connecting unit, and each connecting unit is switchable between normal and bypass states. In the normal state, each connecting unit transmits data from the immediately preceding connecting unit both to the next following connecting unit and to the terminal directly connected to the connecting unit, transmits data from the immediately preceding connecting unit to the next following connecting unit, and transmits data from the directly connected terminal to the next following connecting unit. In the bypass state, the connecting unit transmits data from the immediately preceding connecting unit to the next following connecting unit.

16 Claims, 8 Drawing Sheets

DATA TRANSMISSION SYSTEM

BACKGROUND OF THE INVENTION

This invention generally relates to data transmission systems, and more particularly, to data transmission systems for installations or environments where vulnerability to damage of parts of the system or the need for reliability in data transmission and reception, or both, are high.

The size and complexity of many modern facilities such as modern warships, aircraft, military command stations and missile launching sites, has increased the vulnerability of the intrafacility communications system to disabling damage. The necessity of maintaining communications in such facilities makes it imperative that the communication system function even if part of the system is damaged or destroyed. While various fault or damage tolerant systems are known, these systems have not generally been designed to maintain communications despite multiple consecutive localized faults.

SUMMARY OF THE INVENTION

An object of this invention is to transmit data in a data transmission system of the type having a multitude of data terminals, from one terminal to another terminal despite multiple inoperable terminals between the transmitting and receiving terminals.

Another object of the present invention is to transmit data in a data transmission system of the type having a multitude of data terminals, from each operational terminal to two other operational terminals despite multiple localized failures in the system.

A further object of this invention is to transmit data in a data transmission system of the type having a multitude of data terminals, from each operable terminal to each of the next two subsequent operable terminals, even if multiple terminals are inoperable between the transmitting and receiving terminals.

These and other objectives are attained with a data transmission system, comprising a plurality of connecting units, transmission means interconnecting the connecting units in a sequence to form a data bus for transmitting data, and a plurality of terminals to receive and transmit data. Each terminal is directly connected to a respective one of the connecting units to transmit data between the terminal and that one of the connecting units. Each connecting unit is switchable between normal and bypass states. In the normal state, each connecting unit transmits a first data set from the immediately preceding connecting unit both to the next following connecting unit and to the terminal directly connected to the connecting unit, transmits a second data set from the immediately preceding connecting unit to the next following connecting unit, and transmits a third data set from the directly connected terminal to the next following connecting terminal. In the bypass state, the connecting unit transmits first and second data sets from the immediately preceding connecting unit to the next following connecting unit. The data transmission system also includes control means connected to the connecting units to change each of those units between their normal and bypass states.

Preferably, the transmission means includes first and second sets of data lines. Each data line of the first of these sets is connected to and transmits data between a respective one of the connecting units and the connecting unit next following that respective one connecting unit. Each data line of the second set of data lines is also connected to and transmits data between a respective one of the connecting units and the connecting unit next following that respective one connecting unit. With this arrangement each data line of the first set of data lines transmits to a connecting unit data that was transmitted to the data bus from the nearest preceding operable terminal, and each data line of the second set of data lines transmits to a connecting unit data that was transmitted to the data bus from the second closest preceding operable terminal. In the normal state, each connecting unit transmits data (i) from an input data line of the first set both to the terminal directly connected to the connecting unit and to an output data line of the second set, (ii) from an input data line of the second set to the terminal directly connected to the connecting unit, and (iii) from that directly connected terminal to an output data line of the first set. In comparison, when in the bypass state, each connecting unit transmits data from an input data line to an output data line of the first set, and from an input data line of the second set to an output data line of the second set.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
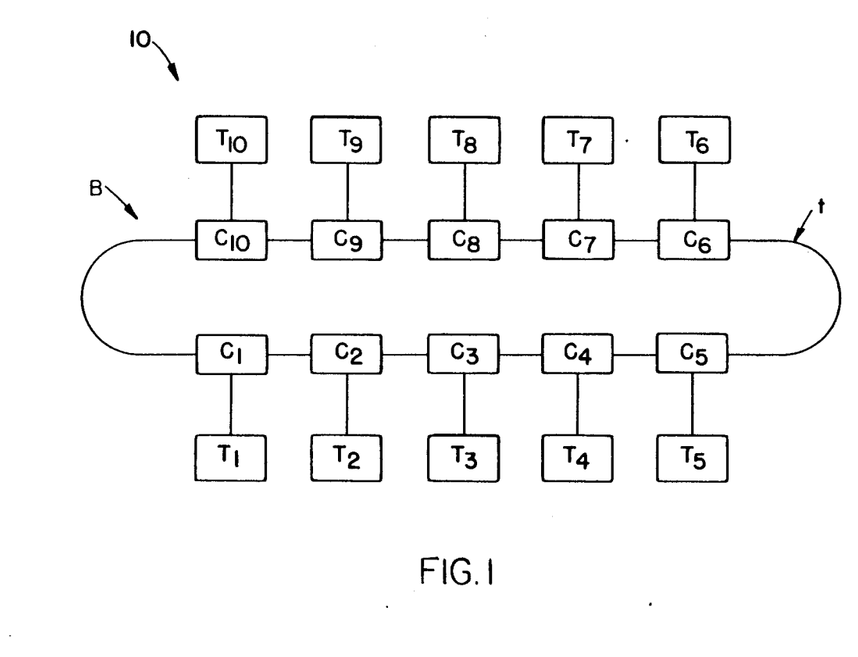
FIG. 1 is a simplified drawing illustrating a data transmission system according to the present invention.

FIG. 1 illustrates data transmission system 10 generally comprising a multitude of connecting units $C_1$–$C_{10}$, transmission means t, and a plurality of data terminals $T_1$–$T_{10}$. Generally, the transmission means t interconnects the connecting units $C_1$–$C_{10}$ in a sequence to form a data bus B for transmitting data, and each terminal $T_1$–$T_{10}$ is connected to the data bus via a respective one of the connecting units $C_1$–$C_{10}$. As shown in FIG. 1, the terminal that is directly connected to a particular connecting unit is given the same subscript given to that connecting unit. Thus, terminal $T_1$ is directly connecting to connecting unit $C_1$, and terminal $T_2$ is directly connected to connecting unit $C_2$. Similarly, terminals $T_3$–$T_{10}$ are directly connected to connecting units $C_3$–$C_{10}$ respectively.

Data transmission systems of the above-described general type are often employed in facilities or environments where reliability is very important, or where the system is vulnerable to damage, or both. Data that is generated in or transmitted to the facility is conducted to one of the terminals of transmission system 10 and thence to data bus B. The data is carried over the data bus to one or more of the other terminals, where the data may be delivered to a suitable receiver, such as a telephone, a printer or a computer. The individual terminals of system 10 thus act as input and output devices, and these terminals may also be used to process or verify data transmitted to them. The specific manner in which the data terminals are constructed and operate is not critical to the present invention. Numerous suitable terminals are well-known in the art and may be used in system 10, and it is unnecessary to describe the terminals herein in detail.

Figure 2:
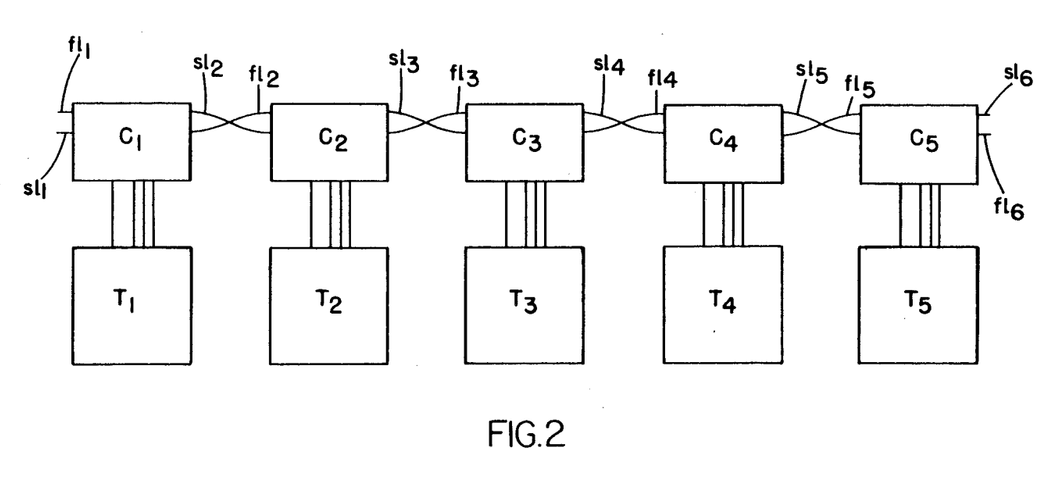
FIG. 2 is a more detailed view of a portion of the system of FIG. 1.

With reference to FIG. 2, the transmission means comprises first and second sets of data lines. Five lines of the first of these sets are shown in FIG. 2 and referenced therein as $fl_1$–$fl_5$, and five lines of the second set are shown in FIG. 2 and referenced therein as $sl_1$–$sl_5$. Each data line of the first set of data lines is connected to and transmits data between a respective one of the connecting units and the connecting unit next following that respective one connecting unit; and, similarly, each data line of the second set of data lines is connected to and transmits data between a respective one of the connecting units and the connecting unit next following that respective one connecting unit. For example, as shown in FIG. 2, first data line $fl_2$ is connected to connecting units $C_1$ and $C_2$, first data line $fl_3$ is connected to connecting units $C_2$ and $C_3$, and first data line $fl_4$ is connected to connecting units $C_3$ and $C_4$. Similarly, second data line $sl_2$ is connected to connecting units $C_1$ and $C_2$, second data line $sl_3$ is connected to connecting units $C_2$ and $C_3$, and second data line $sl_4$ is connected to connecting units $C_3$ and $C_4$.

Thus, as described above, the first and second sets of data lines are similar in that they both are connected to and transmit data between adjacent connecting units. The first and second sets of data lines differ, however, in that they normally transmit different data. In particular, in a normal mode of operation of system 10, discussed in detail below, each data line of the first set transmits to a connecting unit data that was transmitted to the data bus B from the nearest operable terminal preceding that connecting unit, while each data line of the second set transmits to a connecting unit data that was transmitted to the data bus from the second nearest operable terminal preceding that connecting unit.

For example, in a manner more specifically described below, if all of the terminals $T_1$–$T_{10}$ are operable, first data line $fl_2$ transmits to connecting unit $C_2$ data that are transmitted to the data bus from terminal $T_1$, while second data line $sl_3$ transmits to connecting unit $C_3$ data that are transmitted to the data bus from terminal $T_1$. However, if for instance, terminals $T_3$ and $T_4$ become inoperable but the other terminals remain operable, first data line $fl_5$ transmits to connecting unit $C_5$ data that are transmitted to data bus B from terminal $T_2$, and second data line $sl_5$ transmits to connecting unit $C_5$ data that are transmitted to the data bus from terminal $T_1$.

The connecting units $C_1$–$C_{10}$ control the flow of data around the data bus and to and from the terminals $T_1$–$T_{10}$; and each connecting unit is switchable between several states, or operating modes, for routing data through itself in several ways for various purposes. For instance, each connecting unit is switchable between normal and bypass states. In the normal state, a connecting unit transmits a first data set from the immediately preceding connecting unit both to the next following connecting unit and, to the terminal directly connected to the connecting unit. In this state, each connecting unit also transmits a second data set from the immediately preceding connecting unit to the terminal directly connected to the connecting unit, and transmits a third data set from that directly connected terminal to the next following connecting unit. In the bypass state, a connecting unit transmits both those first and second data sets from the immediately preceding connecting unit to the next following connecting unit. Each terminal $T_1$–$T_{10}$ has operating and non-operating states, and preferably each connecting unit $C_1$–$C_{10}$ is in its normal state when the terminal directly connected to the connecting unit is in the operating state, and each connecting unit is in the by-pass state when the terminal directly connected to the connecting unit is in the non-operating state.

The connecting units $C_1$–$C_{10}$ are identical and hence only one, unit $C_1$ shown in FIGS. 3 and 4, will be described in detail. As shown in these figures, a first and a second data line $fl_1$ and $fl_2$ of the first set of data lines, and a first and a second data line $sl_1$ and $sl_2$ of the second set of data lines, extend into the connecting unit $C_1$; and switching means, generally referenced as S, is provided to route data through the connecting unit in the desired manner. Preferably, this switching means includes first, second and third internal lines $l_1$, $l_2$ and $l_3$, and first, second, third and fourth relays $r_1$, $r_2$, $r_3$ and $r_4$. Also, lines $l_4$, $l_5$ and $l_6$ are provided to transmit data between connecting unit $C_1$ and the terminal $T_1$ directly connected to this connecting unit. Line $l_4$ is connected to line $l_1$ via connector $cn_1$, and line $l_2$ is connected to line $fl_2$ by means of connector $cn_2$.

First and second relays $r_1$ and $r_2$ are respectively connected to data lines $fl_1$ and $sl_1$, third relay $r_3$ is connected to data line $sl_2$, and fourth relay $4_4$ is connected to data line $fl_2$. Each of the relays has a normal position and a bypass position. When all of the relays are in their respective normal positions, as shown in FIG. 3, the connecting unit $C_1$ is in its normal state; and when all of the relays are in their respective bypass positions, as shown in FIG. 4, the connecting unit is in its bypass state.

More specifically, when all of the relays are in their normal positions, first relay $r_1$ connects data line $fl_1$ to a first end of internal line $l_1$, second relay $r_2$ connects data line $sl_1$ to line $l_5$, third relay $r_3$ connects data line $sl_2$ to a second end of internal line $l_1$, and fourth relay $r_4$ connects line $l_6$ to data line $fl_2$. In this state, data from data line $fl_1$ are transmitted both to the terminal $T_1$ and to data line $sl_2$. In particular, data are transmitted to terminal $T_1$ via relay $r_1$ and lines $l_1$ and $l_4$, and to data line $sl_2$ via relay $r_1$, line $l_1$ and relay $r_3$. At the same time, data are transmitted from data line $sl_1$ to terminal $T_1$ via relay $r_2$, and data are transmitted from terminal $T_1$ to data line $fl_2$ via line $l_6$ and relay $r_4$.

Figure 4:
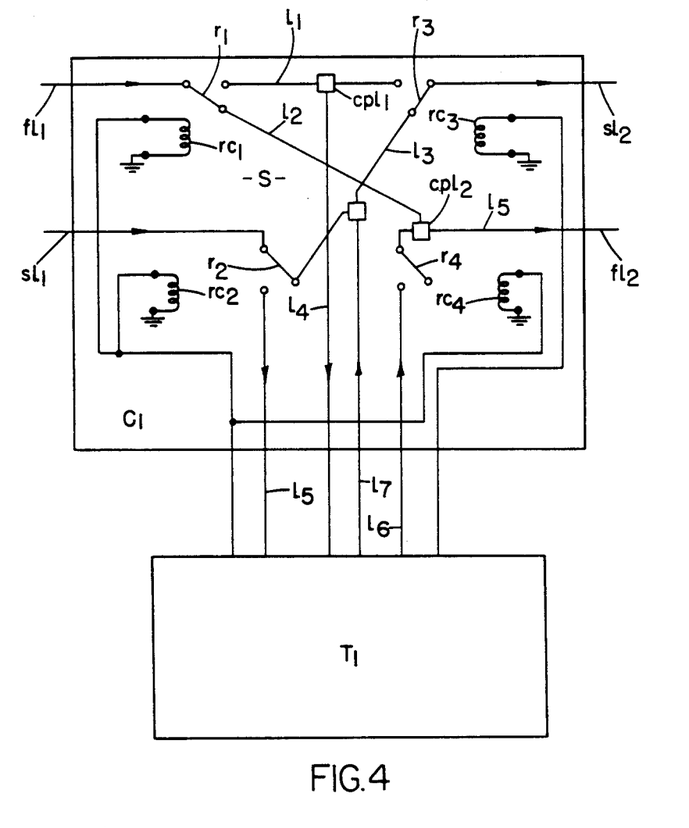
FIG. 4 is similar to FIG. 3, but with the connecting unit being shown in a bypass state.

When all of the relays are in their bypass positions, as shown in FIG. 4, first relay $r_1$ connects data line $fl_1$ to a first end of second internal line $l_2$, second relay $r_2$ connects data line $sl_1$ to first end of third internal line $l_3$, third relay $r_3$ connects data line $sl_2$ to a second end of third internal line $l_3$ and fourth relay $r_4$ is open, disconnecting input line $l_6$ from data line $fl_2$. Under these conditions, data from data line $fl_1$ are transmitted to data line $fl_2$ via relay $r_1$ and line $l_2$, and data from data line $sl_1$ are transmitted to data line $sl_2$ via relay $r_2$, line $ll_3$ and relay $r_3$. Data are not transmitted either from connecting unit $C_1$ to terminal $T_1$, or from this terminal to connecting unit $C_1$.

Preferably, the relays of each connecting unit are biased, for example by suitable springs (not shown), toward their respective bypass positions, and the switching means of each connecting unit further includes means, such as a multitude of relay coils, to selectively hold each relay in its normal position against the bias urging the relay to its bypass position. With reference to FIGS. 3 and 4, each connecting unit may include a plurality of these relay coils $rc_1$–$rc_4$, with each coil connected to a respective one of the relays. In particular, relay coil $rc_1$ is connected to relay $r_1$, and relay coil $rc_2$ is connected to relay $r_2$; and, similarly, relay coils $rc_3$ and $rc_4$ are connected to relays $r_3$ and $r_4$ respectively. When a suitable current is conducted to a given relay coil, that coil is actuated and holds the associated relay in its normal position; however, when no current is conducted through a given relay coil, that coil is deactuated and the associated relay returns to its bypass position.

Preferably, system 10 further includes means to generate and to conduct a respective signal to each of the connecting units to actuate the switching means thereof to switch the connecting unit between the normal and by-pass states thereof. For example, each data terminal may include an electric current source, shown at 12 in FIG. 5, and actuating currents for the relay coils of each connecting unit may be conducted to those coils from the current source of the data terminal directly connected to that connecting unit. In particular, when a given terminal is operable, the actuating currents are conducted to the relay coils of the corresponding connecting unit to hold the relays thereof in their normal positions; however, when a terminal becomes inoperable or is disconnected from the corresponding connecting unit, those actuating currents are not conducted to the relay coils of that connecting unit and the relays thereof are returned to their bypass positions. As will be understood by those of ordinary skill in the art, the control signal used to switch the connecting units between their normal and by-pass states may be generated outside of the data terminals $T_1$–$T_{10}$.

Figure 5:
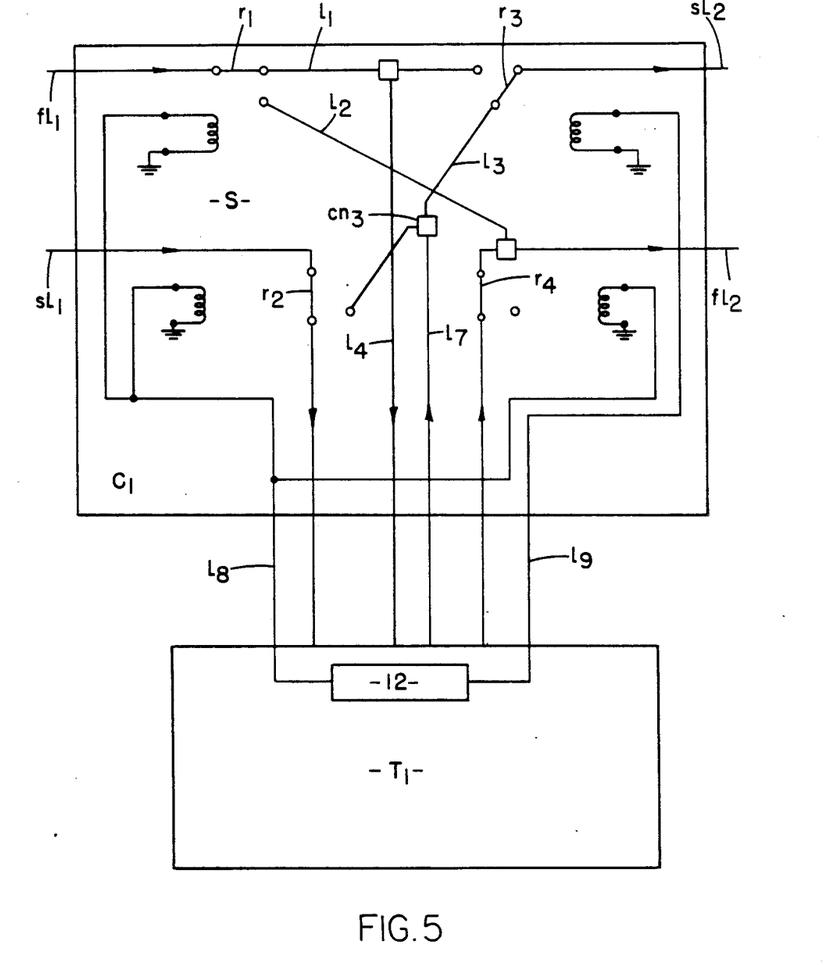
FIG. 5 is similar to FIGS. 3 and 4, but with the connecting unit being shown in a third operating state.

FIG. 5 illustrates a third mode of operation for the connecting units, and in which a connecting unit transmits data from the corresponding data terminal via line $sl_2$ instead of line $fl_2$. To allow this mode of operation, each connecting unit is provided with line $l_7$, which receives data from the terminal that is directly connected to the connecting unit, and which is connected to line $l_3$ via connector $cn_3$.

In this third mode of operation, relays $r_1$, $r_2$, and $r_4$ are in their normal positions, but relay $r_3$ is held in its bypass position. With reference to FIG. 5, data are transmitted to terminal $T_1$ from data line $fl_1$ via relay $r_1$ and lines $l_1$ and $l_4$, and to terminal $T_1$ from second data line $sl_1$ via relay $r_2$ and line $l_5$. Data is not transmitted from first data line $fl_1$ to data line $sl_2$, but instead data is transmitted to that data line $sl_2$ from terminal $T_1$ via data line $l_7$ and relay $r_3$. To hold relay $r_3$ in its bypass position while relays $r_1$, $r_2$ and $r_4$ are all held in their normal positions, the current source for relay coil $rc_3$ is separate from the current source or sources for relay coils $rc_1$, $rc_2$ and $rc_4$, and the necessary currents to actuate coils $rc_1$, $rc_2$ and $rc_4$ are conducted thereto via line $l_8$ from terminal $T_1$, but current is not conducted to coil $rc_3$ via line $l_9$. As will be clear to those of ordinary skill in the art, with this arrangement, to hold all of the relays in their normal positions, the necessary currents are conducted through both lines $l_8$ and $l_9$.

A connecting unit is switched from its normal mode of operation to the above-described third mode when a fault is detected in the path over which data is normally transmitted from the corresponding data terminal to the next succeeding connecting unit. Means (not shown) may be provided to sense such faults and to automatically switch a connecting unit from its normal mode of operation to its third mode of operation in response to detecting such a fault.

In the discussion immediately below, $T_n$ is used to represent any one terminal $T_1$–$T_{10}$, $T_{n+1}$ and $T_{n+2}$ are used to represent respectively the first and second terminals immediately following terminal $T_n$, and $T_{n-1}$ and $T_{n-2}$ are used to represent respectively the first and second terminals immediately preceding terminal $T_n$. Analogously, $C_n$ is used to represent the connecting unit directly connected to terminal $T_n$, $C_{n+1}$ and $C_{n+2}$ are used to represent respectively the first and second connecting units immediately following connecting unit $C_n$, and $C_{n-1}$ and $C_{n-2}$ are used to represent respectively the first and second connecting units immediately preceding connecting unit $C_n$.

With the arrangement of the present invention, the connecting units may operate so that, even despite multiple successive terminal failures, each operable terminal receives data from each of two preceding terminals and transmits data to each of two subsequent terminals. More specifically, under normal operating conditions, in which all terminals are operable and all connecting units are in their normal states, terminal $T_n$ transmits data to the connecting unit $C_n$, and this data is thence transmitted to terminal $T_{n+1}$ via connecting unit $C_{n+1}$, and to terminal $T_{n+2}$ via connecting units $C_{n+1}$ and $C_{n+2}$. At the same time, terminal $T_n$ receives data from terminal $T_{n-1}$ via connecting units $C_{n-1}$ and $C_n$, and from terminal $T_{n-2}$ via connecting units $C_{n-2}$, $C_{n-1}$, and $C_n$.

If one or more of the terminal becomes inoperable, the connecting unit directly connected to each inoperable terminal changes to the bypass state so that all data transmitted to the connecting unit is passed forward to the next succeeding connecting unit. For example, if terminal $T_n$ becomes inoperable but terminals $T_{n-1}$, $T_{n-2}$, and $T_{n+1}$ remain operable, then connecting unit $C_n$ is in the bypass state but connecting units $C_{n-2}$, $C_{n-1}$ and $C_{n+1}$ are in their normal states. Under these circumstances, data transmitted to the data bus B from terminal $T_{n-2}$ is transmitted to terminal $T_{n-1}$ via connecting units $C_{n-2}$ and $C_{n-1}$, and to terminal $T_{n+1}$ via connecting units $C_{n-2}$, $C_{n-1}$, $C_n$ and $C_{n+1}$. Under these same conditions, terminal $T_{n+1}$ receives data from terminal $T_{n-1}$ via connecting units $C_{n-2}$, $C_{n-1}$, and from terminal $T_{n-2}$ via connecting units $C_{n-2}$, $C_{n-1}$, $C_n$ and $C_{n+1}$.

If terminals $T_n$ and $T_{n+1}$ both become inoperable but terminals $T_{n-2}$, $T_{n-1}$ and $T_{n+2}$ remain operable, then connecting units $C_n$ and $C_{n+1}$ are in the bypass states but connecting units $C_{n-2}$, $C_{n-1}$ and $C_{n+2}$ remain in their normal states. Under these circumstances, data transmitted to the data bus B from terminal $T_{n-2}$ are transmitted to terminal $T_{n-1}$ via connecting units $C_{n-2}$ and $C_{n-1}$, and to terminal $T_{n+2}$ via connecting units $C_{n-2}$, $C_{n-1}$, $C_n$, $C_{n+1}$ and $C_{n+2}$. At the same time, terminal $T_{n+2}$ receives data from terminal $T_{n-1}$ via connecting units $C_{n-1}$, $C_n$, $C_{n+1}$ and $C_{n+2}$, and from terminal $T_{n-2}$ via connecting units $C_{n-2}$, $C_{n-1}$, $C_n$, $C_{n+1}$ and $C_{n+2}$.

Figure 3:
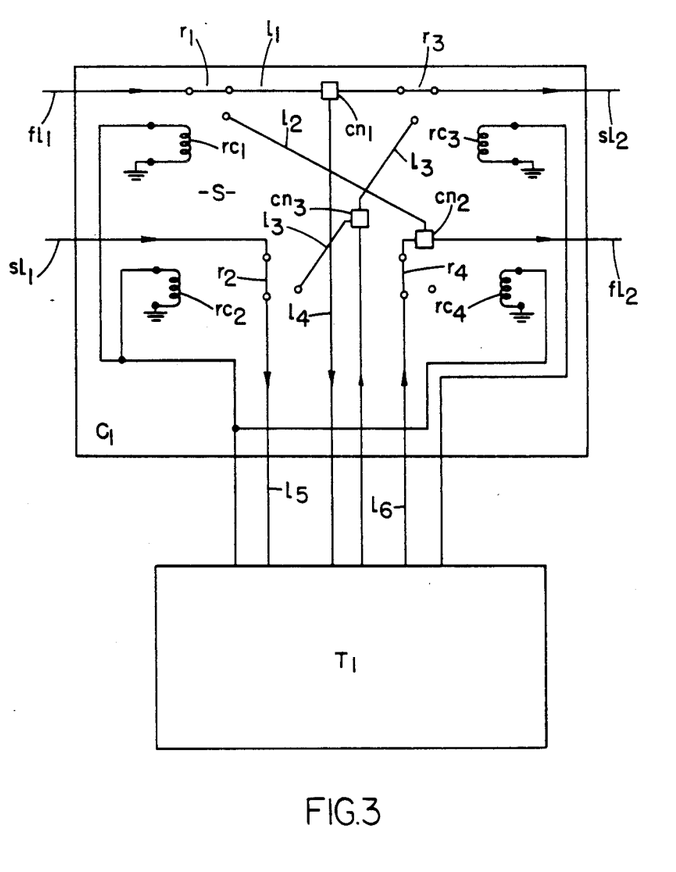
FIG. 3 is a detailed schematic view illustrating a connecting unit and a terminal of the data transmission system, with the connecting unit being shown in a normal operating state.

The particular embodiment of the connecting unit shown in FIGS. 3–5 is specifically designed to transmit optical data, and thus lines $l_1$–$l_7$ and relays $r_1$–$r_4$ may be constructed of optical fibers. For this same reason, connector $cn_1$ is preferably an optical splitter that splits the light signal passing through line $l_1$ into two components, and directs a first of these components to relay $r_2$ and a second of these components into line $l_4$. Also, connectors $cn_2$ and $cn_3$ are optical couplers, with coupler $cn_2$ designed to accept optical input from either relay $r_4$ or line $l_2$ and to conduct this data into line $fl_2$, and with coupler $cn_3$ designed to accept optical input from either the first half of line $l_3$ or from line $l_7$ and to direct this optical data toward the second end of line $l_3$. With this arrangement, preferably line $l_1$ of each connecting unit comprises two separate line segments, one extending between relay $r_1$ and connector $cn_1$, and a second extending between that connector and relay $r_2$; and similarly, line $l_3$ of each connecting unit preferably comprises two separate line segments, one extending between a first end of line $l_3$ and connector $cn_3$, and a second extending between that connector and a second end of line $l_3$. With modifications well within the purview of those of ordinary skill in the art, the connecting units used in the transmission system of the present invention may be designed to transmit data in other forms such as electric currents.

Figure 6:
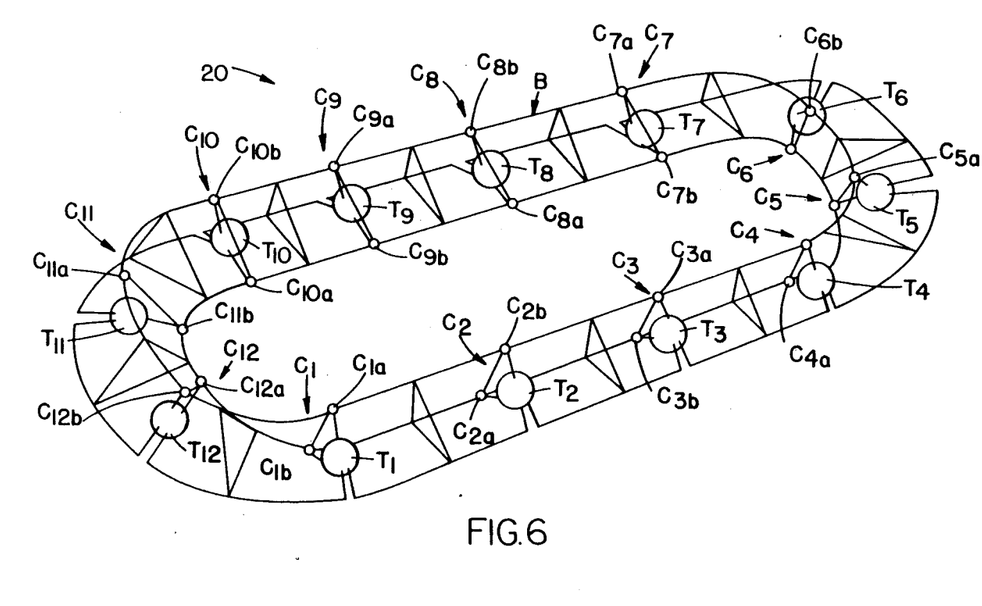
FIG. 6 is a simplified drawing illustrating an alternate data transmission system according to this invention.
Figure 7:
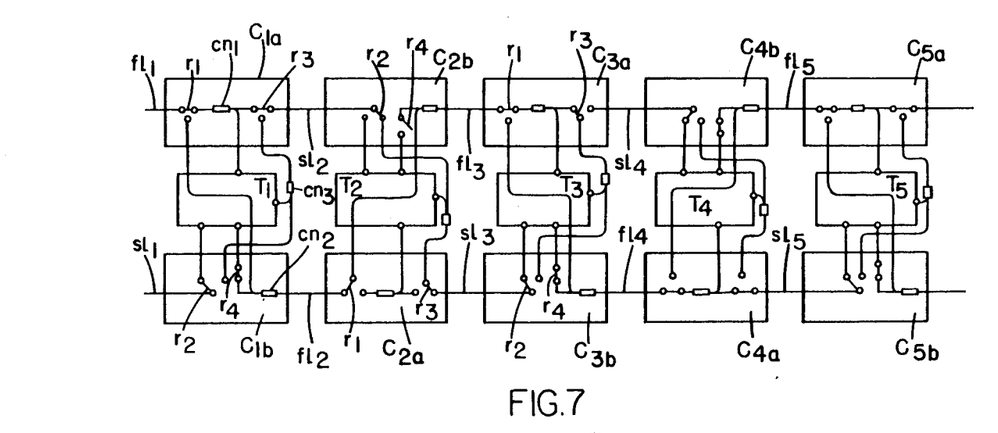
FIG. 7 is a schematic diagram of a portion of the system of FIG. 6.
Figure 8:
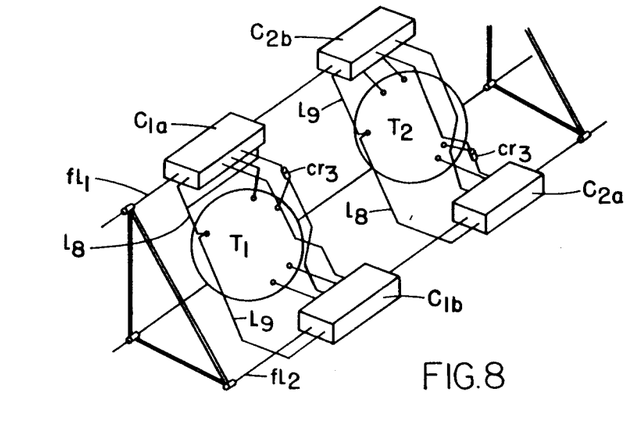
FIG. 8 is an enlarged view of a portion of the system illustrated in FIG. 6.

FIG. 6–8 illustrate a more preferred embodiment 20 of the invention, comprising twelve data terminals $T_1$–$T_{12}$ and twelve connecting units $C_1$–$C_{12}$, and in which each connecting unit includes two separate sections. The first and second sections of each connecting unit are identified in the same manner as the connecting unit itself, but with the added subscripts "a" and "b" respectfully. Thus, the two sections of unit $C_1$ are identified in FIGS. 6 and 7 as $C_{1a}$ and $C_{1b}$, the two sections of unit $C_2$ are identified in FIGS. 6 and 7 as $C_{2a}$ and $C_{2b}$, and, analogously, the two sections of connecting unit $C_3$ are identified in FIGS. 6 and 7 as $C_{3a}$ and $C_{3b}$.

The "a" section of each connecting unit includes the relays $r_1$ and $r_3$ and the optical splitter $cn_1$ of the connecting unit, and the "b" section of each connecting unit includes the relays $r_2$ and $r_4$ and the optical coupler $cn_2$ of the connecting unit. The optical coupler $cn_3$ of each connecting unit is located between the "a" and "b" sections of the connecting unit. With particular reference to FIG. 7, a data line of the first set of data lines is connected to an input side of the "a" section of each connecting unit, and another data line of this first set is connected to an output side of the "b" section of each connecting unit. A data line of the second set of data lines is connected to an input side of the "b" section of each connecting unit, and another data line of this second set is connected to an output side of the "a" section of each connecting unit. With system 20, data bus B includes a third set of data lines (shown in FIGS. 6 and 8) that connect adjacent terminals $T_1$–$T_{12}$ in sequence to transmit data from each of the terminals to the next succeeding terminal. As illustrated in FIG. 7, connecting unit $C_1$ is in the normal state, connecting unit $C_2$ is in the bypass state, and connecting unit $C_3$ is in its third state. For the sake of clarity, the relay coils $rc_1$–$rc_4$ of each connecting unit and the associated electric lines $l_5$ and $l_6$ have been omitted from FIGS. 6 and 7.

Each of the connecting units $C_1$–$C_{12}$ of system 20 is normally held in its normal position by the data terminal directly connected to that connecting unit, and each connecting unit automatically switches into its bypass state when the associated data terminal becomes inoperable. Also, upon detection of certain faults as discussed above, each terminal $T_1$–$T_{12}$ may change an associated connecting unit to its third state shown in FIG. 5.

With system 20, to help a terminal identify the terminal from which data is being received, means (not shown) may be used to delay the transmission of data between adjacent connecting units by a selected period such as forty nano seconds With this arrangement, under normal conditions, there is a delay of that selected period in the data arriving at a given terminal from the nearest preceding operable terminal, and a delay of twice that selected period in the data arriving at that given terminal from the second nearest preceding operable terminal.

Figure 9:
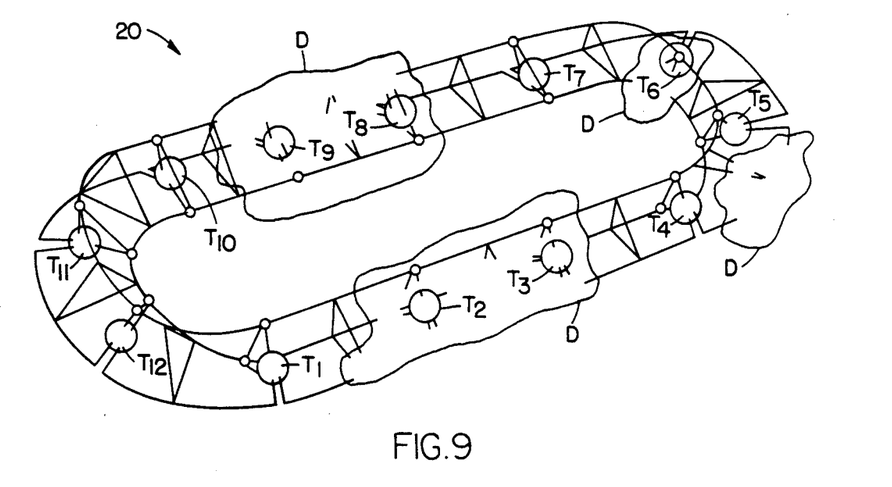
FIG. 9 shows the system of FIG. 6 after that system has been damaged.

FIG. 9 illustrates that system 20 may operate effectively despite extensive damage. The damaged areas of this system are enclosed by the outlines referenced by D, and terminals $T_2$, $T_3$, $T_6$, $T_8$ and $T_9$ are inoperable. Despite this extensive damage, system 20 still effectively circulates data completely around that system.

Figure 10:
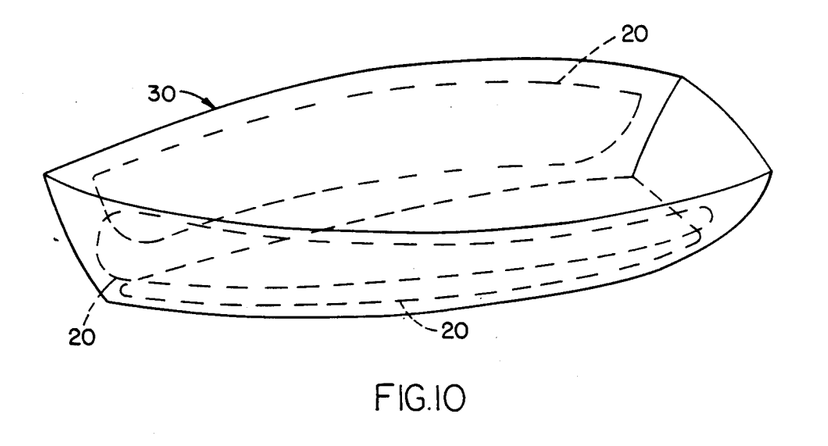
FIG. 10 generally outlines how a group of systems of the type shown in FIG. 6 might be arranged on a ship.

FIG. 10 shows how a group of transmission systems 20 may be employed on a ship 30. First and second such systems may be installed inside the hull of the ship, on the port and starboard sides thereof respectively, and a third system may extend around the bottom of the ship.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A data transmission system, comprising:
a plurality of connecting units;
transmission means interconnecting the connecting units in a sequence to form a data bus for transmitting data;
a plurality of terminals to receive and transmit data; and
means connecting each terminal to an associated, respective one of the connecting units to transmit data between the terminals and the associated connecting units;
each of the associated connecting units being switchable between a normal state and a by-pass state,
in the normal state, each of the associated connecting units (i) transmits one data set from a connecting unit immediately preceding said associated connecting unit both to a connecting unit next following said associated connecting unit and to the terminal directly connected to the associated connecting unit, (ii) transmits another data set from said immediately preceding connecting unit to said next following connecting unit, and (iii) transmits a further data set from said directly connected terminal to said next following connecting unit, and
in the by-pass state, each of the associated connecting units transmits said one and said another data sets from said immediately preceding connecting unit to said next following connecting unit.

2. A data transmission system according to claim 1, wherein:
the transmission means includes a plurality of first and a plurality of second data lines;
each of the first data lines is connected to and transmits data between a respective line of the connecting units and a connecting unit next following said respective one connecting unit;
each of the second data lines is also connected to and transmits data between a respective one of the connecting units and a connecting unit next following said respective one connecting unit; and
each of the associated connecting units receives said one data set from one of the first data lines, and receives said another data set from one of the second data lines.

3. A data transmission system according to claim 2, wherein, in the normal state, each of the associated connecting units transmits said one data set from one of the first data lines to one of the second data lines.

4. A data transmission system according to claim 2, wherein, in the by-pass state, each of the associated connecting units transmits said one data set from one to another of the first data lines, and transmits said another data set from one to another of the second data lines.

5. A data transmission system according to claim 2, wherein:
each of the first data lines comprises a first input line to a respective one of the connecting units and a first output line form another of the connecting units, each of the second data lines comprises a second input line to a respective one of the connecting units and a second output line from another of the connecting units, wherein each connecting unit is connected to first and second input lines and to first and second output lines;
in the normal state, each of the associated connecting units routes data (i) form the first input line to the connecting unit both to the terminal directly connected to the connecting unit and to the second output line from the connecting unit, (ii) from the second input line to the connecting unit to the terminal directly connected to the connecting unit, and (iii) from the terminal directly connected to the connecting unit to the first output line from the connecting unit; and
in the by-pass state, each of the associated connecting units routes data from the first input line to the connecting unit to the first output line from the connecting unit, and from the second input line to the connecting unit to the second output line from the connecting unit.

6. A data transmission system according to claim 5, wherein:
data is transmitted to each connecting unit in the form of optical data;
each of the associated connecting units further includes an optical splitter; and
in the normal state, each of the associated connecting units routes data from the first input line to the connecting unit to the optical splitter thereof, and routes data from the optical splitter of the connecting unit both to the terminal directly connected to the connecting unit and to the second output line from the connecting unit.

7. A data transmission system according to claim 1, wherein:
each terminal has operating and non-operating states;
each of the associated connecting units is in the normal state when the terminal directly connected to the connecting unit is in the operating state; and
each of the associated connecting units is in the by-pass state when the terminal directly connected to the connecting unit is in the non-operating state.

8. A data transmission system according to claim 1, wherein:
each of the associated connecting units includes switching means to switch the connecting unit between the normal and by-pass states thereof; and
the transmission system further includes means to generate and to conduct a respective control signal to each of the associated connecting units to actuate the switching means of the connecting unit to switch the connecting unit between the normal and by-pass states thereof.

9. A data transmission system according to claim 8, wherein:
each terminal includes an electric current source, and
the means to generate and to conduct the control signals includes said current sources, and a multitude of current lines, each of the current lines conducting electric current from the current source of a respective one of the terminals to the connecting unit directly connected to said one terminal.

10. A data transmission system according to claim 8, wherein:
the switching means of each of the associated connecting units includes a multitude of relays, each relay having a normal position and a by-pass position;
when all of the relays of a given one of the associated connecting units are in their respective normal positions, the given connecting unit is in the normal state thereof; and
when all of the relays of a given one of the associated connecting units are in their respective by-pass positions, the given connecting unit is in the by-pass state thereof.

11. A data transmission system according to claim 10, wherein:
all of the relays are biased toward their respective by-pass positions; and
the switching means of each of the associated connecting units includes means to selectively hold each relay of the connecting unit in the normal position of the relay.

12. A data transmission system according to claim 11, wherein:
each terminal has operating and non-operating states;
the switching means of each of the associated connecting units holds the relays of the connecting unit in the normal positions of the relays when the terminal directly connected to the connecting unit is in the operating state; and
each relay of each of the associated connecting units is in the by-pass position of the relay when the terminal directly connected to the connecting unit is in the non-operating state.

13. A data transmission system according to claim 5, wherein:
each of the associated connecting units includes switching means to switch the connecting unit between the normal and by-pass states thereof;

the switching means of each of the associated connecting units includes a multitude of relays, each relay having a normal position and a by-pass position;

when all of the relays of a given one of the associated connecting units are in their respective normal positions, the given connecting unit is in the normal state thereof; and when all of the relays of a given one of the associated connecting units are in their respective by-pass positions, the given connecting unit is in the by-pass state thereof.

14. A data transmission system according to claim 13, wherein said multitude of relays of each of the associated connecting units includes:

a first relay connected to the first input line of the connecting unit;

a second relay connected to the second input line of the connecting unit;

a third relay connected to the second output line of the connecting unit; and a fourth relay connected to the first output line of the connecting unit.

15. A data transmission system according to claim 14, wherein:

the means connecting the terminals to the associated connecting units includes a plurality of third input lines and a plurality of third output lines;

a respective one third input line is connected to each terminal and to the connecting unit associated therewith, to transmit data from the terminal to the associated connecting unit;

a respective one third output line is connected to each terminal and to the connecting unit associated therewith, to transmit data from the connecting unit to the terminal;

the switching means of each of the associated connecting units further includes first, second and third internal lines, each of said internal lines having first and second ends;

when the first relay of each of the associated connecting units is in the normal position of the relay, the first relay connects the first input line to the connecting unit to the first end of the first internal line of the connecting unit, and when the first relay is in the by-pass position thereof, the first relay connects the first input line to the connecting unit line to the first end of the second internal line of the connecting unit;

when the second relay of each of the associated connecting units is in the normal position of the relay, the second relay connects the second input line to the connecting unit to the third output line from the connecting unit, and when the second relay is in the by-pass position thereof, the second relay connects the second input line to the connecting unit to the first end of the third internal line of the connecting unit;

when the third relay of each of the associated connecting units is in the normal position of the relay, the third relay connects the second end of the first internal line of the connecting unit to the second output line from the connecting unit, and when the third relay is in the by-pass position thereof, the third relay connects the second end of the third internal line of the connecting unit to the second output line from the connecting unit; and when the fourth relay of each of the associated connecting units is in the normal position of the relay, the fourth relay connects the third input line to the connecting unit to the first output line of the connecting unit, and when the fourth relay is in the by-pass position thereof, the fourth relay disconnects the third input line to the connecting unit from the first output line form the connecting unit.

16. A data transmission system according to claim 15, wherein:

the means connecting the terminals to the associated connecting units further includes a plurality of fourth output lines;

a respective one fourth output line is connected to each terminal and to the connecting unit associated therewith also to transmit data from the connecting unit to the terminal;

the fourth output line from each of the associated connecting units is connected to the first internal line of the connecting unit, between the ends of the first internal line; and a second end of the second internal line of each of the associated connecting units is connected to the first output line of the connecting unit.

* * * * *

UNITED STATES PATENT AND TRADEMARK OFFICE
CERTIFICATE OF CORRECTION

PATENT NO. : 4,973,955

DATED : November 27, 1990

INVENTOR(S) : Napoleon G. Avaneas

It is certified that error appears in the above-identified patent and that said Letters Patent is hereby corrected as shown below:

Column 4, line 43: "$4_4$" should read as --$r_4$--

Column 4, line 67: "to first" should read as --to a first--

Column 5, line 5: "$11_3$" should read as --$1_3$--

Column 5, line 15: "With-refer-" should read as --With refer- --

Column 5, line 64: "$f_1$" should read as --$fl_1$--

Column 6, line 60: "$C_{n-2}, C_{n-1}$," should read as --$C_{n-1}, C_n$ and $C_{n+1}$,--

Column 7, line 10: delete first occurrence of "$r_1$"

Column 8, line 16: "seconds With" should read as --seconds. With--

Column 9, lines 33 & 41, Claim 5: "form" should read as --from--

Column 12, line 29, Claim 15: "form" should read as --from--

Signed and Sealed this

Twenty-first Day of July, 1992

*Attest:*

DOUGLAS B. COMER

*Attesting Officer*    *Acting Commissioner of Patents and Trademarks*